Aug. 11, 1959  W. H. BIRD ET AL  2,899,337
FIBROUS ABSORBENT BALL AND METHOD OF PRODUCING SAME
Filed March 15, 1955  3 Sheets-Sheet 1
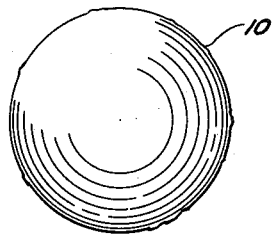
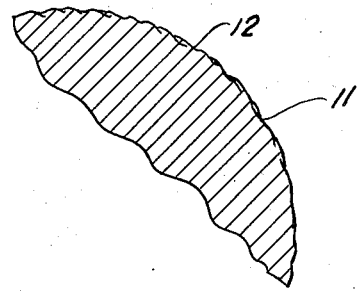
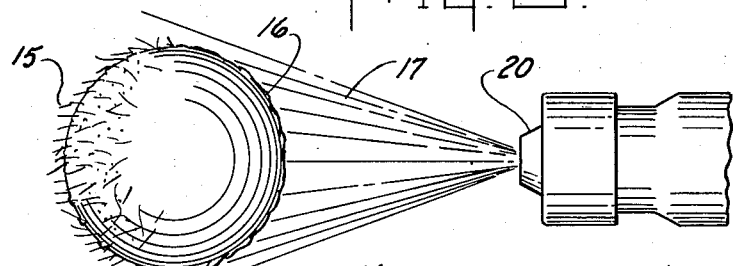
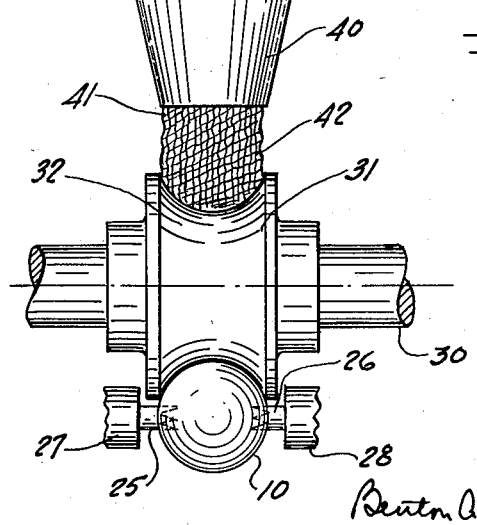
INVENTORS:
WILLIAM H. BIRD
OLIVER S. PLANTINGA
JAMES E. NEWSOME
Benton A. Bull ATTORNEY

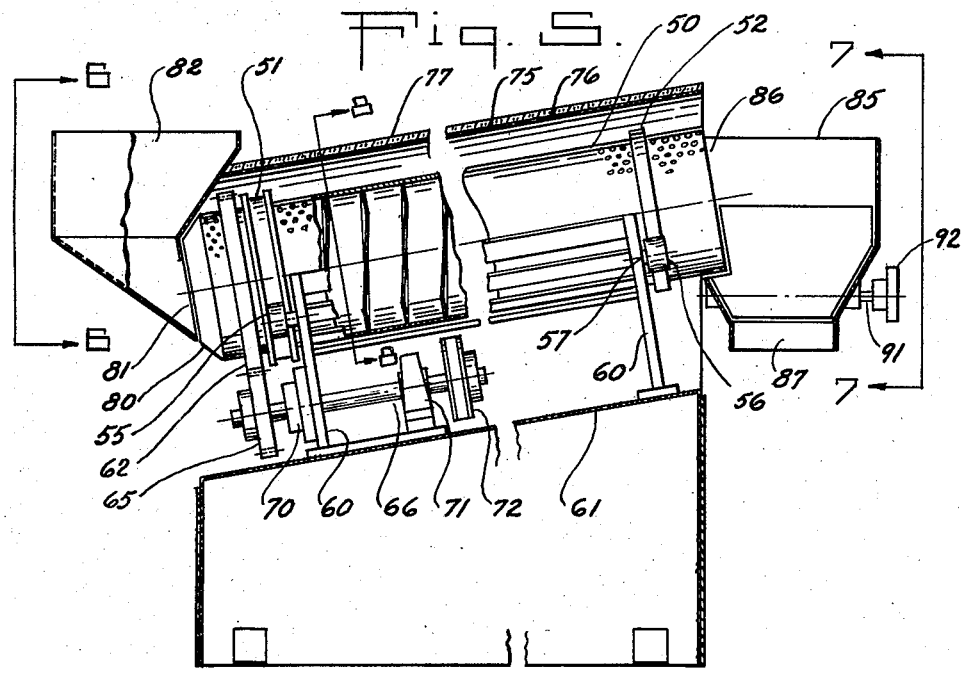
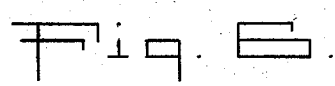
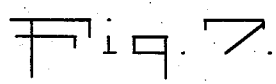
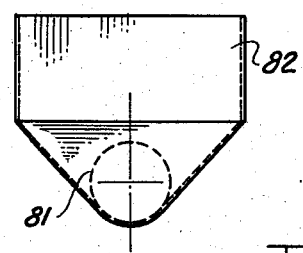
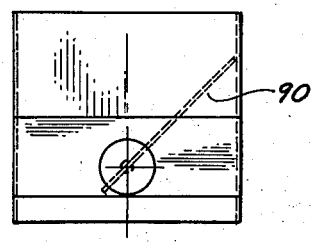
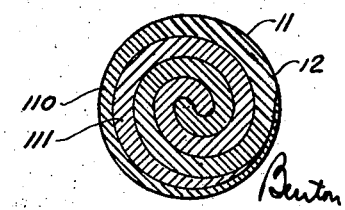
INVENTORS:
WILLIAM H. BIRD
OLIVER S. PLANTINGA
JAMES E. NEWSOME
ATTORNEY Aug. 11, 1959   W. H. BIRD ET AL   2,899,337
FIBROUS ABSORBENT BALL AND METHOD OF PRODUCING SAME
Filed March 15, 1955   3 Sheets-Sheet 3

INVENTORS:
WILLIAM H. BIRD
OLIVER S. PLANTINGA
JAMES E. NEWSOME

Benton A. Bull ATTORNEY

United States Patent Office 2,899,337
Patented Aug. 11, 1959

2,899,337

FIBROUS ABSORBENT BALL AND METHOD OF PRODUCING SAME

William H. Bird, Bound Brook, and Oliver S. Plantinga, Milltown, N.J., and James E. Newsome, Clarendon Hills, Ill., assignors to Johnson & Johnson, a corporation of New Jersey Application March 15, 1955, Serial No. 494,506

10 Claims. (Cl. 117—64)

This invention relates to fibrous light-weight products useful in many applications, such as absorbent cotton balls, fibrous stoppers and the like.

It has been known to use tufts of cotton or like fibrous material as an absorbent or as stoppers for bottles containing pharmaceutical products such as pills or capsules. This conventional cellulosic material suffers from many disadvantages including the unduly large number of loose fibers at the surface which may cause contamination or, in the case of an absorbent, irritation of sensitive portions of the body during and after use. Further preformed wads or balls of absorbent have had the disadvantage of tending to cling to one another in the package and disintegrate to an undesirable degree due to tumbling during shipment. When individual wads or balls are removed from the package, the tendency to cling to each other causes disintegration of the wads to a marked degree. Disintegration, however, is most notable in the case of fibrous stoppers where the wads are forced into bottlenecks and spread out in the larger part of the bottle above the contents just inside the neck. When these stoppers are removed, in order to gain access to the contents of the bottle, in most, if not all, cases the stopper disintegrates, and invariably the stopper is very difficult to remove from the bottle.

The light-weight, compressible, flexible and resilient nature of the fibrous wads and balls is a desirable characteristic. In many instances, such as in the case of the absorbent balls, the soft and pleasant "hand" of the surface is also an important characteristic. Accordingly, one important object of the present invention is to produce a fibrous light-weight article having the surface fibers bonded and retained so as to prevent separation from the main portion of the ball while still preserving the desirable characteristics of flexibility, resiliency and compressibility of the product.

A preferred object of the invention is to so treat the surface of an absorbent fibrous product that the surface fibers may be retained without substantially or detachably interfering with the soft pleasant "hand" of the surface.

Still another object of the invention is to produce a fibrous product which does not tend to fall apart but retains its shape, coherency and identity even though packaged in direct contact with other objects having similar characteristics.

Another object of the invention is to produce a coherent fibrous product free from loose protruding fibers on its surface, as described above, by means and methods which do not cause the product to be irritating or toxic in any way nor to become discolored or otherwise degraded upon aging or sterilization. It is a further object to produce such a product without introducing material which is in any way incompatible with medicaments which might be incorporated therein. It will be understood that the just-mentioned objects are especially important in manufacture of a surgical or medical absorbent which is intended to be used in applying medications to the body or even for absorbing body fluids.

The product of the invention is a fibrous product of such light weight as to be readily compressible with the fingers, i.e. not greater than a density of about 20 grains per cubic inch, preferably below about 12 grains per cubic inch, having its surface fibers impregnated and bonded with any of certain bonding agents described below. The amount of the bonding agent is sufficient to retain the surface fibers as aforesaid, but sufficiently low so that the product retains substantially all of its original compressibility and resiliency.

The size of the fibrous product of the invention may vary over a wide range. Similarly, the density expressed, for example, in grains per cubic inch is subject to considerable variation within the maximum limit described above which provides desired compressibility and resiliency. The product density will generally be at least about 3 grains per cubic inch, which, depending upon the type of fiber, the number of crimps per inch, etc., will provide the sought-for product coherency. For uses where absorbency is a necessary property, the product preferably has a globular shape, as in the case of cotton balls. In this embodiment a small size product may have a density of from about 10 to 11 grains per cubic inch and a total weight of about 1.0 to 1.8 grains. A medium size product may have a density of about 4 to 7 grains per cubic inch and a total weight of about 3.5 to 4.5 grains. A large size product may have a density from about 5 to about 8 grains per cubic inch and a total weight of about 12.5 to 15.5 grains, while extra large sizes such as those used for perineal work may have densities of from 9 to 16 grains per cubic inch and a total weight of 21 to 55 grains.

As indicated above, the surface fibers of the product of the invention are treated with a bonding agent in order to secure them in position and prevent protrusion and loss. The amount of bonding agent is critical insofar as it must be controlled to perform the job of retaining the fibers without, however, interfering with the desired compressibility and resiliency of the product. The bonding agent may be applied by methods described hereinafter. The amount of such bonding agent, however, should be at least about .007 milligram per square centimeter of surface in order to achieve the objects desired. At the other end of the scale the amount of bonding agent should not be greater than about .05 milligram per square centimeter of surface in order to retain the desired compressibility and resiliency of the product.

As indicated above, a preferred object of the invention resides in a product which not only has its surface fibers bonded, but in which the amount of bonding agent is so controlled that the soft texture and "hand" of the product is not materially affected. Such a product is obtained by controlling the amount of bonding agent on the surface at a level not substantially greater than about .02 milligram per square centimeter.

The bonding agents used according to the invention are non-toxic materials compatible with the other materials with which they may come in contact during use and having the property of adhering to the fibers. One class of impregnants includes certain water-soluble materials, i.e. those having long-chain molecular structure with recurring hydroxyl groups. These materials possess markedly superior properties with respect to binding the surface fibers consistent with good absorbency, freedom from toxicity and irritation, compatibility with medicaments and good aging characteristics. These agents comprise the water-soluble methyl celluloses (which term, as used herein, includes substituted methyl celluloses such as carboxymethyl cellulose and sodium salt of carboxymethyl cellulose), the ethyl celluloses (including substituted ethyl celluloses, e.g. hydroxyethyl cellulose), and the polyvinyl alcohols.

Of the methyl celluloses, commercially available methyl cellulose or hydroxymethyl cellulose is advantageous for the purposes of the invention. Methyl cellulose having a degree of substitution in the approximate range 0.5 to 2.6 methyl groups per glucose residue will generally be found to have sufficient water solubility to produce a sizing solution which, when applied to the fibrous product, will effect the desired bonding of the fibers. Methyl cellulose having a degree of substitution in the approximate range 1.1 to 2.6 is particularly suitable. In the case of hydroxymethyl cellulose, the material may have a degree of substitution substantially above 2.6.

The ethyl celluloses are generally less soluble than the methyl celluloses and, accordingly, ranges of suitable degrees of substitution are somewhat narrower. Satisfactory material may be found in the approximate range 0.5 to 1.3 degrees of substitution. Hydroxyethyl cellulose under comparable conditions is generally more soluble than the ethyl cellulose and, accordingly, the range of suitable degree of substitution is somewhat broader than for ethyl cellulose. Hydroxyethyl cellulose having desirably high solubility may be found in the approximate range 0.5 to 2.6 degrees of substitution.

The sodium salt of carboxymethyl cellulose (sodium cellulose glycolate) is another suitable bonding agent. The pH of the salt lies in the range 6–8 which is well within the U.S.P. specifications of a neutral material. The other desired properties, including inertness and compatibility, are also possessed by this impregnant. The degree of substitution should be in the range about 0.3 to 2.6.

Polyvinyl alcohol is supplied commercially in a variety of types and by a variety of manufacturers. Any of these types which possess sufficiently high water solubility as, for example, those recommended for use in sizing solutions, etc., may be used for the purposes of the present invention. One type having a viscosity of 45 to 55 centipoises as determined by the Hoeppler falling ball method (determined in a 4% aqueous solution at 20° C.), 98–100% hydrolyzed (from vinyl acetate), and having a pH of from 6 to 8, may be used as a bonding agent in the present invention.

This type polyvinyl alcohol is recommended by the manufacturer as a sizing for yarn in 4% aqueous solution or for paper in a 1 to 2.5% aqueous solution. Another suitable type is that sold by the same manufacturer having viscosities of 35 to 45 by the Hoeppler method, 86 to 89% hydrolyzed having a pH in the range 6 to 8. The latter polyvinyl alcohol was recommended by the manufacturer for sizing fine yarns.

In certain embodiments of the invention, starch or vegetable gums may be utilized as a bonding agent.

The concentration of the binding agent in the sizing solution (preferably aqueous solution) is controlled within the limits of solubility of the particular agent employed (and discussed above) concurrently with the pick-up of sizing solution by the fibrous product to effect the desired degree of incorporation of the agent into the product as discussed above. Further, the concentration should be sufficiently low to provide sufficient fluidity of the sizing solution to permit the impregnant to become uniformly dispersed over the surface of the fibrous product. Generally speaking, if pick-up of solution is to be low, higher concentration will be employed (consistent with good distribution of bonding agent), whereas, if pick-up of solution is to be high, for example of the order of 100%, lower concentration may be utilized. A suitable range of concentration is approximately 0.1% as a practical minimum up to the saturation concentration of the particular bonding agent. Preferred concentrations which afford maximum ease and efficiency of operation lie in the approximate range 0.5 to 2%.

Viscosity is a factor of some importance to consider in selecting a suitable bonding agent. The viscosity should be sufficiently low to permit application of sizing solution of a concentration which is suitable according to the foregoing description, i.e. provide sufficient incorporation of bonding agent and good distribution thereof by the particular apparatus at hand. Solutions having viscosities below about 2,000 centipoises at 20° C., and having concentration in the ranges indicated above, will generally be satisfactory for sizing fibrous products. Preferred viscosities are in the approximate range 2 to 100 centipoises.

The details of the structure of the parts of the present invention and the various procedures for manufacture thereof may be understood by reference to the attached drawings in which like reference numbers designate the same part on the various figures.

Fig. 1 shows a cotton or other fibrous ball which has been prepared according to the invention.

Fig. 2 is a fragmental sectional view of the ball shown in Fig. 1.

Fig. 3 illustrates one phase in one method of manufacture of the product.

Fig. 4 illustrates an alternative method of manufacturing the product.

Fig. 5 shows an apparatus used in a later stage of the manufacture of the product.

Fig. 6 is an end view of a portion of the apparatus shown in Fig. 5.

Figure 7 shows a portion of the apparatus of Fig. 5 seen from the opposite end.

Fig. 7A is a sectional view of a modified type product according to the invention.

Figure 8:
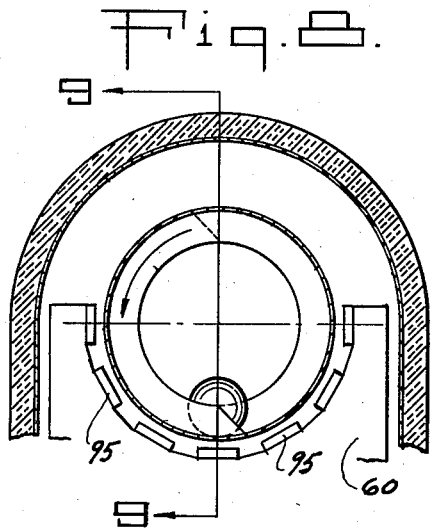
Fig. 8 is a sectional view taken on plane 8—8 of Fig. 5, on an enlarged scale.

Reference number 10, as indicated previously, designates the product of the invention as seen in Fig. 2. The surface 11 has fibers 12 which are held in place and do not project in substantial number. The function of the bonding agent previously described is to retain the fibers in this position.

In Fig. 3 there is illustrated one method by which the bonding agent may be applied to the fibrous mass. It will be noted at 15 that the untreated side of the product has many loose projecting fibers. On the other hand, fibers 16 on the side of the product that is receiving the spray 17 from nozzle 20 are, even at this intermediate stage in the operation, substantially retained and laid down nearly parallel to the surface of the product.

An alternative method of applying the bonding agent solution is shown in Fig. 4. Here the fibrous product 10 is held between two forked shaft members 25 and 26 which rotate in bearings 27 and 28, respectively. Shaft 30 rotates in bearings not shown and supports forming roll 31 which has a concave surface 32 of a configuration substantially that desired in the end product. Supported from frame 35 and held by bolting means 36 and bracket 37 is a wick holder 40 which has the shape of an inverted cone and holds wick 41. The bottom edge 42 of wick 41 bears directly against the concave surface 32 of forming roll 31. Wick 41 contains and holds a large amount of the bonding agent solution described above, and may be saturated therewith. Incremental amounts, as desired, may be added at the top surface 45 of the wick from suitable metering devices through connecting tubes not shown. The solution travels down through the wick and a small amount thereof continuously passes on to concave surface 32 and thence by rotation of forming roll 31 around to the external surface of the fibrous body 10. Fibrous body 10 rotates with driven fork shafts 25 and 26, and thereby wipes the bonding agent solution from concave surface 32. If desired, forming roll 31 may be stationary rather than rotating, in which case the bonding agent solution may travel by gravity from the bottom surface 42 of wick 41 around the concave surface of the forming roll to the portion thereof which contacts the external surface 11 of fibrous body 10.

After having the bonding agent applied to its external surface, whether by the method described in Fig. 3 or that described in Fig. 4, the fibrous body then may be dried by using the apparatus shown in Figs. 5 to 11, inclusive. This apparatus comprises a rotating perforated drum 50 which is supported on integral rims 51 and 52 which bear against rollers such as those shown at 55 and 56 and two corresponding rollers on the opposite side of the apparatus, not shown. Rollers 55 and 56 turn on axle 57 which is supported by upright members, i.e. cradles, 60 which in turn are supported by the machine frame 61. At the lower end of drum 50 there is a large gear 62 which cooperates with pinion 65 to drive the drum 50. Pinion 65 is driven by shaft 66 turning in bearings 70 and 71. Shaft 66 is driven in turn by pulley 72 and belt and connecting motor not shown in the drawing.

Housing 75 surrounds rotating cylinder 50 and is secured to the machine frame 61. Housing 75 is formed of a metal shell 76 and a thick layer of insulation 77.

The feed end of cylinder 50 is tapered as shown at 80 to meet the opening 81 of feed hopper 82 which is also shown in end view in Fig. 6. At the opposite or discharge end of cylinder 50 there is mounted on housing 75 a discharge hopper 85 which has an inlet end 86 cooperating with the discharge of cylinder 50, a discharge end 87, and a rotatable baffle 90, turning on shaft 91, operable by handle 92. By rotating baffle 90 from one position, such as that shown in Fig. 7, to the opposite position, the product being discharged from the end of cylinder 50 may be deflected so as to leave hopper 85 at one side of opening 87 into one container or, if desired, and when desired, through the opposite side of opening 87 into a different receptacle.

Cradles 60, as shown in Fig. 8, are also the support for strip heaters 95 which extend between the two cradles. Heaters 95 are connected with electric wiring, not shown.

Figure 9:
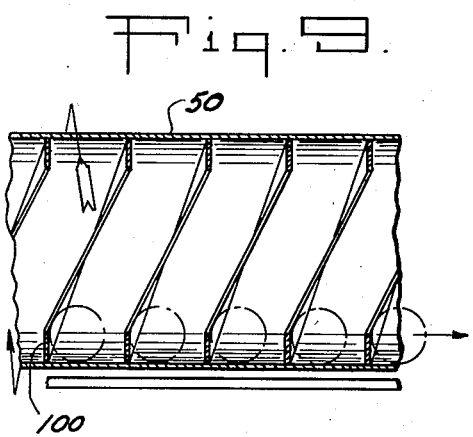
Fig. 9 is a longitudinal sectional view taken on plane 9—9 of Fig. 8.
Figure 10:
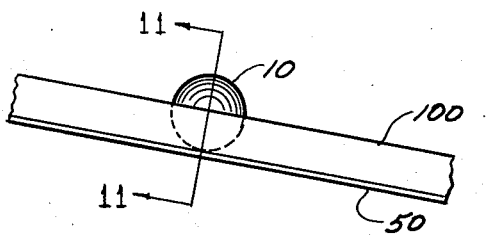
Fig. 10 is a developed view of a portion of the apparatus shown in Figs. 5, 8 and 9.
Figure 11:
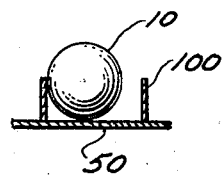
Fig. 11 is a partial sectional view taken on plane 11—11 of Fig. 10.

Details of the rotatable cylinder 50 are shown in Fig. 9. Inside of this cylinder there are disposed flights 100 in corkscrew fashion. These may have a double or higher multiple thread, as shown in Fig. 9, or, if desired, a single thread may be used. As the cylinder rotates, flights 100 at the feed end 80 pick up balls 10 one at a time, i.e. one ball between each flight portion adjacent the bottom of the cylinder. As rotation continues, each ball is moved forward through the cylinder by gravity and the pressure against the adjacent portion of the flight and the upwardly curving internal surface of the cylinder. In effect, in its travel through cylinder 50, each of the balls 10 is rolling through a channel, as shown in Figs. 10 and 11. Each ball, of course, travels many times the single circumference of cylinder 50, and in this travel rolls so that substantially all portions of surface 11 of the ball 10 contact the heated surfaces of cylinder 50 and flight 100. The over-all effect is an ironing-down of the surface fibers while the solution of bonding agent at the surface of the ball is being dried. The fibers are held in this ironed-down condition which contributes to the outstanding advantages of the product of the invention.

Although the drying of the impregnated fibrous product is illustrated as occurring by contact with a heated plate, specifically rolling of the ball on a heated surface, this feature of the invention is not limiting since the product may, if desired, be dried by air or radiation. Further, employing the concept of ironing by contact with a hot surface, means other than those specifically described above may be utilized if desired.

Figure 12:
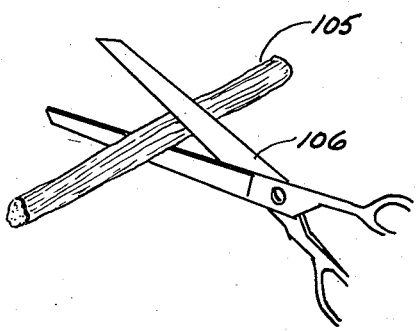
Fig. 12 shows a severing operation in preparing a product of the invention for use.

Referring to Fig. 12, there is shown an elongated cylinder or roving 105 of fibrous material such as cotton. This roving has its surface impregnated with bonding agent solution, for instance, by the method illustrated in Fig. 3, and the impregnated roving is dried. The drying may be carried out in heated air or by radiation. The dried bonding agent restrains and retains the surface fibers, as shown in Fig. 2. By severing individual segments of this elongated cylinder, for example with scissors 106, there are formed individual small cylinders 107, shown in Fig. 13. These cylinders are useful as fibrous stoppers to be inserted in pill or capsule bottles to prevent breakage of such pills or capsules during transportation. The advantages of the surface-bonded fibrous stopper are described at some length earlier in this specification.

Although cotton fibers have been mentioned specifically, other types of fibers suitable for purposes of the present invention include rayon, preferably crimped rayon, and fibers having the desired softness and resiliency. Textile length fibers, particularly those of cellulosic origin, are notably adaptable for purposes of the present invention.

Figure 13:
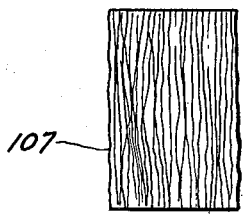
Fig. 13 shows the severed product prepared by the method of Fig. 12.

A modified type fibrous product according to the invention is illustrated in Fig. 7A, which is a transverse sectional view taken through the center of the product. As before, the bonded fibers 12 in external surface 11 are shown, as in Figs. 1 and 2. This type construction is preferably used for absorbent products, e.g., of globular shape, but may also be applied to the elongated cylinders adapted to be severed at intervals, as illustrated in Figs. 12 and 13. The structure consists of two spirally wound webs or layers. The external layer 110 is preferably textile fiber of the type described above. It will be noted that this forms substantially the entire external curved surface of the product. Web or layer 111 may be formed of other type fibers such as wood pulp, creped tissue or similar short fiber (less expensive material). This short fiber is removed from substantially the entire surface of the product. The bonding agent and the natural tendency of the fibers in the exterior layer 110 to cling together hold the product as a coherent unit.

*Example I*

Cotton balls having a diameter of about 1½ inches and weight of about 12.5–15.5 grains were sprayed on their surface by the procedure illustrated in Fig. 3 with a solution of methyl cellulose. The solution concentration was 2% methyl cellulose and 1% polyoxyethylene derivative of sorbitan monolaurate ("Tween 20"). Degree of substitution of the methyl cellulose was 0.9 and viscosity in the 2% solution at 25° C. was 17.7 centipoises. A sufficient amount of solution was sprayed on each ball to provide on the surface about .044 milligram per square centimeter. After impregnation, the balls were ironed by rolling down an inclined heated plate substantially as shown in Figs. 10 and 11. The resulting product had a substantially smooth surface free of protruding or loose fibers. The balls did not tend to stick to each other during storage. They held their shape very well when shaken in a box under conditions simulating actual transportation and handling. Some of the balls were packed in boxes and subjected to steam sterilization. They did not adhere to one another in the box before nor after sterilization.

*Example II*

The procedure described in Example I was repeated in manufacture of cotton balls except that the impregnated solution employed was as follows: carboxymethyl cellulose, sodium salt (degree of substitution 0.9) 0.50%; wetting agent (polyoxyethylene derivative of sorbitan monolaurate) 1.0%; water 98.5%. The solution (viscosity 8.1 centipoises at 25° C.) was applied to the external surfaces of the balls by the procedure described and illustrated in Fig. 4. The amount of solution applied was such that after drying the balls there was about .01 milligram per square centimeter of ball surface on the surface of the ball. The balls were dried and the surface fibers ironed down in the apparatus described in Fig. 5. The end product had the excellent properties of the invention products described above.

*Example III*

A roving or coil of cotton fibers having a density of about 5.5 to 7.1 grains per cubic inch was sprayed on its external surface by the method shown in Fig. 3 with an aqueous bonding solution. The solution employed had a concentration of about ¾% methyl cellulose. The sprayed material was dried in hot air. The solution was applied in amount so that the dried material had .012 milligram of methyl cellulose per square centimeter of surface. The bonded roving was cut into lengths about 1 to 2 inches, and used as fibrous bottle stoppers. It was found to adhere well together, retain its shape, and was capable of being removed from the bottle intact with maximum ease.

Although specific embodiments of the invention have been described in the foregoing presentation and in the drawings, it is understood that the scope of protection sought covers modifications and equivalents within the spirit of the invention.

The claims are:

1. A light-weight fibrous absorbent ball having density at least about 3 but not greater than about 20 grains per cubic inch so as to be coherent but readily compressible with finger pressure, the surface fibers of said product being bonded with a solid binder in amount to restrain and substantially prevent protrusion of surface fibers, the amount of said agent being at least .007 but not greater than about .05 milligram per square centimeter of surface so as to preserve the compressibility of the product.

2. A light-weight fibrous absorbent ball comprising cellulosic textile fibers and having density at least about 3 but not greater than about 12 grains per cubic inch so as to be coherent but readily compressible with finger pressure, the surface fibers of said product being bonded with a solid binder in amount to restrain and substantially prevent protrusion of surface fibers, the amount of said agent being at least .007 but not greater than about .02 milligram per square centimeter of surface so as to provide a soft surface and preserve the compressibility of the product.

3. A light-weight fibrous absorbent ball comprising cellulosic textile fibers and having density at least about 3 but not greater than about 12 grains per cubic inch so as to be coherent but readily compressible with finger pressure, the surface fibers of said product being bonded with a solid water soluble and non-toxic binder in amount to restrain and substantially prevent protrusion of surface fibers, the amount of said agent being at least .007 but not greater than about .02 milligram per square centimeter of surface so as to provide a soft surface and preserve the compressibility of the product.

4. A light-weight fibrous absorbent ball comprising cellulosic textile fibers and having density at least about 3 but not greater than about 12 grains per cubic inch so as to be coherent but readily compressible with finger pressure, the surface fibers of said product being bonded with a water soluble bonding agent having long-chain molecular structure with free hydroxyl groups of the class consisting of a methyl cellulose, an ethyl cellulose, and a polyvinyl alcohol, said agent being in an amount to restrain and substantially prevent protrusion of surface fibers, the amount of said agent being at least .007 but not greater than about .02 milligram per square centimeter of surface so as to provide a soft surface and preserve the compressibility of the product.

5. A sterile light-weight fibrous absorbent ball comprising cellulosic textile fibers and having density at least about 3 but not greater than about 12 grains per cubic inch so as to be coherent but readily compressible with finger pressure, the surface fibers of said product being bonded with a water soluble bonding agent having long-chain molecular structure with free hydroxyl groups of the class consisting of a methyl cellulose, an ethyl cellulose, and a polyvinyl alcohol, said agent being in an amount to restrain and substantially prevent protrusion of surface fibers, the amount of said agent being at least .007 but not greater than about .02 milligram per square centimeter of surface so as to provide a soft surface and preserve the compressibility of the product.

6. A sterile light-weight fibrous absorbent ball comprising cellulosic textile fibers and having density at least about 3 but not greater than about 12 grains per cubic inch so as to be coherent but readily compressible with finger pressure, the surface fibers of said product being bonded with a solid binder in amount to restrain and substantially prevent protrusion of surface fibers, the amount of said agent being at least .007 but not greater than about .02 milligram per square centimeter of surface so as to provide a soft surface and preserve the compressibility of the product.

7. A light-weight fibrous absorbent ball comprising both textile fibers and short fibers, the outer surface thereof being composed primarily of textile fibers, said ball having a density at least about 3 but not greater than about 12 grains per cubic inch so as to be coherent but readily compressible with finger pressure, the surface fibers of said product being bonded with a solid binder in amount to restrain and substantially prevent protrusion of surface fibers, the amount of said agent being at least .007 but not greater than about .02 milligram per square centimeter of surface so as to provide a soft surface and preserve the compressibility of the product.

8. The method of producing a light-weight, fibrous, coherent but readily compressible product which comprises applying to the external surface of a mass of fibers having density of at least about 3 but not greater than about 20 grains per cubic inch, a solution of a bonding agent in amount to restrain and substantially prevent protrusion of surface fibers in the finished product, the amount of said agent being at least .007 but not greater than .05 milligram per square centimeter of surface so as to preserve the compressibility of the product, and subsequently ironing said external fibers until they are dry, the pressure during said ironing being only sufficient to smooth protruding surface fibers into contact with the surface of said fiber mass.

9. The method of producing a light-weight, fibrous, coherent but readily compressible product which comprises applying to the external surface of a mass of fibers having density of at least about 3 but not greater than about 20 grains per cubic inch, a solution of a bonding agent in amount to restrain and substantially prevent protrusion of surface fibers in the finished product, the amount of said agent being at least .007 but not greater than .05 milligram per square centimeter of surface so as to preserve the compressibility of the product, and subsequently ironing said external fibers until they are dry, by gravity rolling the fibrous product having a bonding agent solution applied to its surface on a heated metal plate, the pressure during said ironing being only sufficient to to smooth protruding surface fibers into contact with the surface of said fiber mass.

10. The method of producing a light-weight, fibrous coherent but readily compressible product having a density of at least about 3 but not greater than about 20 grains per cubic inch and comprising both textile fibers and short fibers, the outer surface thereof being composed primarily of textile fibers, which method comprises applying to the external surface of the mass of fibers a solution of a bonding agent in amount to restrain and substantially prevent protrusion of surface fibers in the finished product, the amount of said agent being at least .007 but not greater than .05 milligram per square centimeter of surface so as to preserve the compressibility of the product, and subsequently ironing said external fibers until they are dry, by gravity rolling the fibrous product having a bonding agent solution applied to its surface on a heated metal plate, the pressure during said ironing being only sufficient to smooth protruding surface fibers into contact with the surface of said fiber mass.

References Cited in the file of this patent

UNITED STATES PATENTS

| | | |
|---|---|---|
| 1,438,064 | Simmons | Dec. 5, 1922 |
| 1,729,272 | King | Sept. 24, 1929 |
| 1,928,568 | Loomis | Sept. 26, 1933 |
| 2,070,300 | Smith | Feb. 9, 1937 |
| 2,123,750 | Schulz | July 12, 1938 |
| 2,193,188 | Bradley | Mar. 12, 1940 |
| 2,244,097 | Burkart | June 3, 1941 |
| 2,327,250 | Cruickshank | Aug. 17, 1943 |
| 2,339,562 | Eustis | Jan. 18, 1944 |
| 2,673,819 | Wendell | Mar. 30, 1954 |
| 2,719,806 | Nottebohm | Oct. 4, 1955 |
| 2,758,039 | Barbour | Aug. 7, 1956 |

FOREIGN PATENTS

| | | |
|---|---|---|
| 388,544 | Great Britain | Mar. 2, 1933 |